US012807805B2

(12) United States Patent
Dixon et al.

(10) Patent No.: US 12,807,805 B2
(45) Date of Patent: Nov. 24, 2026

(54) PACKAGING

(71) Applicant: COLORMATRIX HOLDINGS, INC., Avon Lake, OH (US)

(72) Inventors: Mark Dixon, Knowsley (GB); Adrian Carmichael, Knowsley (GB); Steven Burgess Tattum, Knowsley (GB)

(73) Assignee: COLORMATRIX HOLDINGS, INC., Avon Lake, OH (US)

( * ) Notice: Subject to any disclaimer, the term of this patent is extended or adjusted under 35 U.S.C. 154(b) by 908 days.

(21) Appl. No.: 18/011,816

(22) PCT Filed: Jun. 3, 2021

(86) PCT No.: PCT/IB2021/054856

§ 371 (c)(1),
(2) Date: Dec. 20, 2022

(87) PCT Pub. No.: WO2021/260463

PCT Pub. Date: Dec. 30, 2021

(65) Prior Publication Data

US 2023/0235167 A1 Jul. 27, 2023

(30) Foreign Application Priority Data

Jun. 22, 2020 (GB) ..................................... 2009459
Jul. 3, 2020 (GB) ..................................... 2010235

(51) Int. Cl.
*C08L 67/02* (2006.01)
*B29C 49/00* (2006.01)
(Continued)

(52) U.S. Cl.
CPC .......... *C08L 67/02* (2013.01); *B29C 49/0005* (2013.01); *B29C 49/08* (2013.01);
(Continued)

(58) Field of Classification Search
None
See application file for complete search history.

(56) References Cited

U.S. PATENT DOCUMENTS 5,089,309 A 2/1992 Odate et al.
6,083,585 A 7/2000 Cahill et al.
(Continued)

FOREIGN PATENT DOCUMENTS

CN 104859128 A 8/2015
EP 0456929 A2 11/1991
(Continued)

OTHER PUBLICATIONS

International Search Report for Application No. PCT/IB2021/054856, mailed Sep. 6, 2021, 3 pages.

*Primary Examiner* — Yan Lan
(74) *Attorney, Agent, or Firm* — Lippes Mathias LLP

(57) ABSTRACT

A container body comprises a base, a side wall extending from the base and a neck portion arranged to engage a closure for the container body, wherein: (i) said container body includes a cyclic olefin copolymer (COC) and polyester; or (ii) said container body includes a polymethylpentene (PMP) and polyester; wherein, in both cases (i) and (ii), the side wall of the container body has an L* of at least 90 and the neck portion has an L* of at least 84.

19 Claims, 3 Drawing Sheets

(51) Int. Cl.

| | |
|---|---|
| ***B29C 49/08*** | (2006.01) |
| ***B65D 1/02*** | (2006.01) |
| ***B65D 81/30*** | (2006.01) |
| ***B65D 85/80*** | (2006.01) |
| ***C08K 3/08*** | (2006.01) |
| ***C08K 3/22*** | (2006.01) |
| ***C08K 3/30*** | (2006.01) |
| *B29C 49/02* | (2006.01) |
| *B29C 49/06* | (2006.01) |
| *B29K 45/00* | (2006.01) |
| *B29K 67/00* | (2006.01) |
| *B29K 105/00* | (2006.01) |
| *B29K 505/02* | (2006.01) |
| *B29K 509/00* | (2006.01) |
| *B29L 31/00* | (2006.01) |

(52) U.S. Cl.

CPC ........... *B65D 1/0207* (2013.01); *B65D 81/30* (2013.01); *B65D 85/80* (2013.01); *C08K 3/08* (2013.01); *C08K 3/22* (2013.01); *C08K 3/30* (2013.01); *B29C 2049/024* (2013.01); *B29C 49/06* (2013.01); *B29K 2045/00* (2013.01); *B29K 2067/003* (2013.01); *B29K 2105/0085* (2013.01); *B29K 2505/02* (2013.01); *B29K 2509/00* (2013.01); *B29K 2995/0025* (2013.01); *B29L 2031/7158* (2013.01); *C08K 2003/0812* (2013.01); *C08K 2003/2241* (2013.01); *C08K 2003/3036* (2013.01); *C08K 2201/014* (2013.01); *C08L 2203/10* (2013.01)

(56) References Cited

U.S. PATENT DOCUMENTS 8,575,296 B2 * 11/2013 Vernon ............... B29C 49/0005
524/502
2002/0160215 A1 10/2002 Peiffer et al.

FOREIGN PATENT DOCUMENTS

| | | | |
|---|---|---|---|
| EP | 3023458 | A1 | 5/2016 |
| GB | 2207439 | A | 2/1989 |
| JP | 2017030244 | A | 2/2017 |
| JP | 2017030251 | A | 9/2017 |
| WO | 2011099486 | A1 | 8/2011 |
| WO | 2019013371 | A1 | 1/2019 |
| WO | 2019117725 | A1 | 6/2019 |
| WO | 2019133713 | A1 | 7/2019 |
| WO | 2020106156 | A1 | 5/2020 |

* cited by examiner

PACKAGING

This invention relates to packaging and materials therefor. Preferred embodiments relate to containers, such as PET bottles, which are white in colour and are arranged to block and/or restrict light from entering the container to reduce the risk of the contents of the container degrading during storage due to exposure to light.

It is known to produce containers with light protection obtained by incorporating inorganic shielding fillers into PET. For example, EP3023458A1 relates to a single-layer plastic container with light shielding, wherein the procedure to incorporate a light-shielding filler is performed by adding, to a main PET plastic base, a concentrated additive that contains a high impact polystyrene (HIPS) and/or polypropylene (PP) polymer base in which inorganic shielding fillers that contain $TiO_2$ and Al have previously been dispersed.

Other plastic containers which address the same problem to protect their contents (e.g. UHT long-life milk) from light radiation are available in different plastic media and with different types of structures, for example: three-layer polyethylene, three-layer PET, two-layer PET or single-layer PET.

Conventionally, plastic containers which incorporate light protection have a white-coloured surface due to the fact that one of the most widespread uses for such containers is the bottling of long-life milk (e.g. UHT milk) and/or UHT milk products. There are known solutions to the problem in which $TiO_2$, a white pigment with a high concealing power, is combined with light absorbers that effectively reinforce the shield provided by the $TiO_2$. However, these light absorbers necessarily darken the surface of the containers rendering an unattractive and undesirable greyish colour and this means that the concentrations that can be used in the containers and hence the threshold of their efficacy are limited.

Applicant's co-pending application GB1915770.0 discloses the use of cyclic-olefin copolymers (COCs) in creating opacity and/or light blocking in PET-based single-layer containers. Subsequent SEM analysis by Applicant (which is not in the public domain) has been undertaken to investigate the mechanism by which the COC creates opacity and/or blocks light. SEM results show that preforms which contain a major amount of PET and a minor amount of COC include discreet phases comprising generally spherical particles of COC distributed through a PET phase. When a bottle is blown from such a preform having a typical wall thickness of 3.5 to 4 mm, the preform is heated and stretched. This stretching produces a container having a wall thickness of typically 0.3 mm. During the stretching, the PET is oriented but, it is confirmed by Applicant's SEM on the blown bottle, that the COC remains in the form of generally spherical particles in a discreet phase, separate from the PET phase. The structure brought about by the stretching of the bottle wall is found to appear white, is highly opaque and exhibits high levels of light blocking.

However, it has been found that the neck of the blown bottle appears less white compared to the bottle wall. It is believed this is due to the fact that the neck of a preform is not stretched during production of a bottle and, in fact, it is found that the neck of the preform and the neck of the bottle are substantially identical in terms of the distribution of the PET/COC and the level of whiteness/opacity.

As a result of the aforesaid, Applicant has found that bottles comprising PET/COC may include a relatively white and opaque side wall but a darker neck. If the difference in lightness between the side wall and neck is too great, the bottle will be at least aesthetically unacceptable and may also have unacceptable performance.

There have also been proposals to use polymethylpentene (PMP) as an opacifier in bottles. However, as with bottles comprising PET/COC, it has been found that, with some formulations used to produce white, opaque bottles, the neck of the blown bottle appears less white compared to the bottle wall.

It is an object of the present invention to address the above described problems.

The present invention is based on the appreciation that, if the lightness of a preform from which a bottle is blown is greater than a predetermined value, a bottle can be blown therefrom which has acceptable lightness of both the neck and side wall of the bottle.

According to a first aspect of the invention, there is provided a container body which comprises a base, a side wall extending from the base and a neck portion arranged to engage a closure for the container body, wherein:

(i) said container body includes a cyclic olefin copolymer (COC) and polyester; or (ii) said container body includes a polymethylpentene (PMP) and polyester;

wherein, in both cases (i) and (ii), the side wall of the container body has an L* of at least 90 and the neck portion has an L* of at least 84.

The L* of the container body may be assessed using a reflectance technique (suitably so the thickness of any sample is not generally relevant) as described in Test 2 hereinafter.

The L* of the neck portion of the container body is suitably taken to be the L* of the side wall of a preform from which the container body is blown. It may be assessed as described in Test 1 hereinafter.

To reduce the risk the lightness of the side wall is too light compared to the lightness of the neck (which may lead to the container body being aesthetically unacceptable due to the lightness contrast between side wall and neck), the difference between the L* of the side wall and preform is suitably less than a predetermined level as determined by Applicant. The difference is suitably less than 12, suitably less than 10, preferably less than 9, especially 8 or less.

The L* of the side wall of the container body may be at least 90 or at least 92. The L* may be less than 98, less than 96 or less than 94. The L* may be in the range 90 to 95.

The L* of the neck portion may be at least 83, preferably at least 84, more preferably at least 85. The L* of the neck portion may be less than 90 or 88. The L* of the neck portion may be in the range 83-89 or 83-87.

A first ratio defined as the L* of the side wall of the container body divided by the L* of the neck portion may be at least 1.03 or at least 1.05; it may be less than 1.15 or less than 1.10.

The difference between the b* of the side wall of the container body and the neck portion of the container body may be greater than 1.0. It may be less than 3.0.

The difference between the b* of the side wall of the container body and the neck portion of the container body may be less than 1.0.

Said container body preferably has a light transmission (LT %) at 550 nm as described in Test 3 of less than 1.0%, preferably less than 0.5%, more preferably less than 0.2%.

Said neck portion is suitably a portion of the container body which includes polyester (eg PET) which is substantially, preferably entirely, unstretched (eg in a blow molding process) and/or is suitably substantially identical to the neck portion in a preform from which the container body is blown.

Said neck portion preferably extends from an open end of the container body, suitably inwards. It may extend a distance of at least 1 cm or at least 1.5 cm. A second ratio, defined as the total length of the container body (suitably measured from the base to the neck portion) divided by the length of the neck portion may be at least 5 or at least 10.

Said neck portion preferably includes grooves, for example, screw-threads for releasably engaging a closure.

Said container body may have volume in the range 0.1 to 5 litres or in the range 0.2 to 1.5 litres.

A ratio (A) defined as the weight of polyester divided by the weight of COC or PMP in the container body may be in the range 8 to 32, preferably in the range 15 to 30, more preferably in the range 15 to 25.

A ratio (B) defined as the weight of polyester divided by the weight of COC or PMP in a layer of the container body may be in the range 8 to 32, preferably in the range 15 to 30, more preferably in the range 15 to 25. In preferred embodiments, said container body is defined by a single layer, in which case, said sidewall of the container body may consist of a single layer and ratio (B) suitably defines the weight of polyester divided by the weight of COC or PMP in said single layer of the container body.

Said container body may include 1 to 10 wt % of COC or PMP, preferably 3 to 8 wt % of COC or PMP, more preferably 3 to 6 wt % of COC or PMP. Said container body may include 85 to 97 wt % of polyester. Said container body may include 88 to 96 wt % of polyester, 3 to 8 wt % of COC or PMP and 1 to 7 wt % of other ingredients. In one preferred embodiment, said container body includes 88.0 to 94.0 wt % of polyester, 3.0 to 6.0 wt % of COC and 1.0 to 7.0 wt % of other ingredients. In another preferred embodiment, said container body includes 88.0 to 94.0 wt % of polyester, 3.0 to 6.0 wt % of PMP and 1.0 to 7.0 wt % of other ingredients.

A single layer of said container body may include 1 to 10 wt % of COC or PMP, preferably 3 to 8 wt % of COC or PMP, more preferably 3 to 6 wt % of COC or PMP. Said single layer of said container body may include 85 to 97 wt % of polyester. Said single layer may include 88 to 96 wt % of polyester, 3 to 8 wt % of COC or PMP and 1 to 7 wt % of other ingredients. In one preferred embodiment, said single layer includes 88.0 to 94.0 wt % of polyester, 3.0 to 6.0 wt % of COC and 1.0 to 7.0 wt % of other ingredients. In another preferred embodiment, said single layer includes 88.0 to 94.0 wt % of polyester, 3.0 to 6.0 wt % of PMP and 1.0 to 7.0 wt % of other ingredients.

Said COC may include a repeat unit of formula (I)

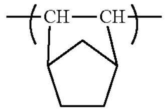

which may be optionally substituted (but is preferably not substituted).

Said COC may include a repeat unit of formula (II)

$$-(CH_2-CH_2)-$$

which may be optionally-substituted (but preferably is not substituted).

Said COC may include at least 40 mol %, preferably at least 45 mol %, of said repeat unit of formula I. It may include less than 70 mol % or less than 65 mol % of said repeat unit of formula I.

Said COC may include less than 60 mol %, preferably less than 55 mol % of said repeat unit of formula II. It may include at least 30 mol % or at least 35 mol % of said repeat unit of formula II.

Said COC may have a density in the range 1000 to 1050 $kg/m^3$, measured as described in ISO 1183.

Said COC may have a Melt Volume Rate (MVR), measured as described in ISO 1183 in the range 1 to 50 $cm^3$/10 mins. In some embodiments, the MVR may be less than 25 $cm^3$/10 mins.

Said COC may have a Tensile Modulus (1 mm/min), measured as described in ISO 527-2/1A of greater than 2700 MPa. It may be in the range 2750 to 3400 MPa.

Said COC may have a glass transition temperature (Tg) (10° C./min) measured as described in ISO 11357-1, -2, -3 of greater than 100° C., preferably greater than 130° C. Said Tg may be less than 190° C. Said Tg may be in the range 135° C. to 185° C.

Said COC may have a DTUL @ 0.45 MPa, measured as described in ISO 75-1, -2 of greater than 100° C., preferably greater than 120° C. The DTUL may be less than 190° C. Said DTUL may be in the range 118 to 180° C.

A said PMP may refer to a thermoplastic homopolymer or copolymer which suitably is a 4-methyl-1-pentene based polyolefin having a repeat unit formula:

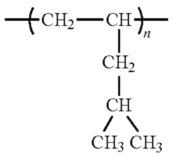

Integer n is suitably high enough on a number average basis (e.g. being at least 30) for the polymer to have a number average molecular weight higher than the number average molecular weight of an oligomer. The monomeric unit (ie the unit above excluding integer n) can homopolymerize or copolymerize, such as with an alkylene moiety. Suitable examples of comonomers include ethylene, propylene, 1-butene, 1-pentene, 1-hexene, 1-heptane, 1-octene, nonene and 1-decene. PMP may include copoylmers with a decene (eg decene, hexadecene, octadecene, especially with 1-decene, 1-hexadecene, 1-octadecene) or combinations thereof.

Typical PMPs may have a melting point of about 240° C. and are nearly transparent with a low specific gravity of about 0.83 g/cm. The reported haze is less than 1% with a transmittance of more than 90%. Typical PMPs have a refractive index of 1.46.

Preferred PMPs have a very low surface tension for example of less than 30 mN/m or less than 25 mN/m.

PMP is available from Mitsui Chemicals America, Inc. PMP grades RT-31 and/or RT-18 may be preferred.

Said PMP may have a MFR measured by the MCI method with an applied force of 5 kgf at 260° C. of 15-30 g/10 min, preferably 20-27 g/10 mins; and/or said PMP may have a melting point measured by DSC according to ASTM D3418 of at least 229° C., preferably in the range 230-235° C.;

and/or said PMP may have a Vicat softening temperature, measured by ASTM-D1525 (injection moulded specimen (2 mm thick×2 pcs), heat speed: 50° C./hour with an applied load of 10N), of 165 to 170° C., preferably of 167 to 169° C.; and/or said PMP may have a heat distortion temperature, measured by ASTM-D648 (injection moulded specimen (0.25 inch thick), heat speed of 120° C./hour and applied stress of 0.45 MPa) of 127° C.; and/or said PMP may have a flexural modulus measured according to ASTM-D790 on an injection moulded specimen (3.2 mm thick), crosshead speed 1.3 mm/in, span length 51 mm) of 1425 to 1475 MPa, preferably about 1450 MPa; and/or a flexural strength, measured by ASTM-D7 90 and the same conditions, of 34 to 39 MPa, preferably about 36 MPa; and/or said PMP may have an Izod impact strength, measured according to ASTM-D256, on an injection moulded specimen (machined notch) of 21 to 27 J/m, preferably about 24 J/m; and/or said PMP may have a Rockwell Hardness measured according to ASTM-D785 on an injection moulded specimen, with measurement on the R scale, of 75 to 90, preferably 80 to 85; and/or said PMP may have a refractive index measured on an injection moulded specimen (2 mm thick) at a wavelength of 589 nm, according to ASTM-D542, of 1.4 to 1.5, for example 1.462.

As stated, said container body comprises a polyester. Said polyester is preferably a polyethylene terephthalate which term, in the context of the present specification, is intended to encompass co-polyethylene terephthalates. Co-polyethylene terephthalates of polyethylene terephthalate may contain repeat units from at least 85 mole % terephthalic acid and at least 85 mole % of ethylene glycol. Dicarboxylic acids which can be included, along with terephthalic acid, are exemplified by phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid and sebacic acid. Other diols which may be incorporated in the co-polyethylene terephthalates, in addition to ethylene glycol, include diethylene glycol, triethylene glycol, 1,4-cyclohexanedimethanol, propane-1,3-diol, butane-1,4-diol, pentane-1,5-diol, hexane-1,6-diol, 3-methylpentane-2,4-diol, 2-methyl pentane-1,4-diol, 2,2,4-trimethylpentane-1,3-diol, 2-ethylhexane-1,3-diol, 2,2-diethylpropane-1,3-diol, hexane-1,3-diol, 1,4-di(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. In a preferred embodiment said polyethylene terephthalate has less than 10 mole %, more preferably less than 6 mole % especially less than 2 mole % comonomer substitution. Preferably, said co-polyethylene terephthalate does not comprise co-polyethylene terephthalate; it suitably comprises substantially a homopolymer produced by esterification or transesterification of terephthalic acid or dimethyl terephthalate and ethylene glycol to produce bis(2-hydroxyethyl) terephthalate which is then subjected to polycondensation at high temperatures in vacuum in the presence of a catalyst.

Said polyester may have a Tg of less than 90° C., for example of less than 85° C. The Tg may be at least 60° C. or 65° C.

The difference between the Tg of the polyester and that of said COC or said PMP may be at least 30° C.; the difference may be less than 90° C., or less than 60° C.

As used herein the term "IV" refers to the Inherent Viscosity of the polymeric material. It may be determined on a solution of 0.5 g of polymer dissolved in 100 ml of a mixture of phenol (60% by volume) and tetrachloroethane (40% by volume).

The IV of the polyester is preferably greater than 0.5 dL/g, more preferably greater than 0.65 dL/g.

Said polyester and said COC or said PMP are preferably not wholly miscible. Hence, a mixture comprising said polyester and COC or said PMP may include observable regions of COC or PMP dispersed in the polyester. Such regions may be observed by SEM. The observable regions of COC or PMP may be particulate for example generally spherical.

The sum of the wt % of thermoplastic polymers (eg polyester(s)), COC(s) and PMP(s) in said container body may be at least 88 wt %, preferably at least 92 wt %, more preferably at least 94 wt %. The sum may be less than 99 wt % or less than 97 wt %.

As described, said container body comprises polyester. Said container body preferably comprises a polyester as the major thermoplastic polymer in the container body. Polyester (especially PET) preferably makes up at least 75 wt %, preferably at least 85 wt %, of the total wt % of thermoplastic polymers in the container body.

Said container body may define a receptacle for example a bottle, suitably excluding any closure (e.g. cap) thereof. Said container body may include a ridged, for example screw-threaded, neck arranged to cooperate with a closure, for example a screw-threaded closure.

Said container body and/or a sidewall thereof preferably includes only one layer of material which suitably defines the container body (excluding any closure for the container body). Thus, said container body and/or a sidewall thereof preferably do not include any laminated region or multi-layered region.

Said container body may include a first light shielding pigment. Such a pigment may interact with incident light by primarily diffracting light and optionally scattering and/or absorbing. Diffraction occurs as a result of a difference in refractive index between the light shielding pigment and the COC/PMP or polyester. Light shielding pigments may solely diffract, as in the case of titanium dioxide ($TiO_2$), or they may both scatter and absorb, as in the case of black iron oxide (PBIk 11). Some examples of light shielding pigments include titanium dioxide ($TiO_2$), ultramarine blue (PB 29), metal oxide particles such as red iron oxide (PR 101), black iron oxide (PBIk 11), chromium green-black hematite (PG 17), cobalt aluminate (PB 28), aluminium trihydrate (Al (OH)3), barium sulfate (BaS04), zinc sulfide (ZnS), metal flake (eg aluminium or bronze flakes), calcium carbonate and mica.

Said first light shielding pigment is preferably zinc sulfide (ZnS). Said first light shielding pigment preferably includes at least 95 wt %, especially at least 99 wt % zinc sulfide (ZnS).

Said container body may include less than 8 wt %, preferably less than 6 wt %, more preferably less than 5 wt %, especially no more than 4.5 wt % of said first light shielding pigment. Said container body may include at least 1 wt % or at least 2 wt % of said first light shielding pigment. Said container body may include 2 to 5 wt % of said first light shielding pigment.

Said container body may include less than 2 wt %, preferably less than 1.5 wt %, more preferably no greater than 1.0 wt % of titanium dioxide. Said container body may include 0 to 2 wt %, preferably 0 to 1.5 wt %, of titanium dioxide. In one embodiment, said container body may include 0 wt % of titanium dioxide A single layer of said container body may include less than 8 wt %, preferably less than 6 wt %, more preferably less than 5 wt %, especially no more than 4.5 wt % of said first light shielding pigment. A single layer of said container body may include at least 1 wt % or at least 2 wt % of said first light shielding pigment. A single layer of said container body may include 2 to 5 wt % of said first light shielding pigment.

A single layer of said container body may include less than 8 wt %, preferably less than 6 wt %, more preferably less than 5 wt %, especially no more than 4.5 wt % of zinc sulphide. A single layer of said container body may include at least 1 wt % or at least 2 wt % of said zinc sulphide. A single layer of said container body may include 2 to 5 wt % of said zinc sulphide.

Said container body may include a second light shielding pigment. Said second light shielding pigment may be selected from titanium dioxide ($TiO_2$), ultramarine blue (PB 29), metal oxide particles such as red iron oxide (PR 101), black iron oxide (PBIk 11), chromium green-black hematite (PG 17), cobalt aluminate (PB 28), aluminium trihydrate (Al(OH)3), barium sulfate (BaS04), zinc sulfide (ZnS), metal flake (eg aluminium or bronze flakes), calcium carbonate and mica. Said first and second light shielding pigments are preferably different and/or do not include all of the same elements.

Said second light shielding pigment is preferably particulate metal, for example a metal flake, for example particulate aluminium or aluminium flake. Said second light shielding pigment preferably includes at least 95 wt %, especially at least 99 wt % aluminium.

Said container body may include less than 1.0 wt %, preferably less than 0.50 wt %, more preferably less than 0.050 wt % of said second light shielding pigment. Said container body may include at least 0.001 wt % or at least 0.025 wt % of said second light shielding pigment. Said container body may include 0.025 to 0.50 wt % of said second light shielding pigment.

The sum of the wt % of light shielding pigments (eg said first, said second and/or any other light shielding pigments) in said container body may be less than 8 wt %, preferably less than 6 wt %, especially less than 5 wt %. The sum may be at least 1 wt % or at least 3 wt %. The sum may be in the range 2.0 to 5.0 wt %.

In one embodiment, said container body includes 88-93 wt % polyester (eg PET), 1-6 wt % zinc sulfide, 3-7 wt % of COC, 0.01 to 0.2 wt % of particulate aluminium (eg flake). In another embodiment, said container body includes 88-93 wt % polyester (eg PET), 1-6 wt % zinc sulfide, 3-7 wt % of PMP, 0.01 to 0.2 wt % of particulate aluminium (eg flake).

In a preferred embodiment, said container body includes 88-93 wt % polyester (eg PET), 2-5 wt % zinc sulphide, 4-7 wt % of COC, 0.01 to 0.10 wt % of particulate aluminium (eg flake). In another preferred embodiment, said container body includes 88-93 wt % polyester (eg PET), 2-5 wt % zinc sulphide, 4-7 wt % of PMP, 0.01 to 0.10 wt % of particulate aluminium (eg flake).

Said container body preferably comprises and/or is defined by a mixture, for example a substantially homogenous mixture, of said polymer and said cyclic olefin copolymer (COC) or PMP and, when provided, said first light shielding pigment and said second light shielding pigment.

Said container body may comprise virgin polyester or recycled polyester, for example PET.

Said container body is preferably part of a beverage container. It may have a volume of no more than 5 litres, for example no more than 2 litres or no more than 1 litre.

Said container body for example a sidewall thereof, may have a thickness of at least 100 microns or at least 200 microns. The thickness may be less than 500 microns or less than 400 microns or less than 398 microns. The thickness may be in the range 102 to 398 microns and may comprise PET.

The neck of said container body may have a maximum internal diameter of at least 10 mm or at least 15 mm. The maximum internal diameter may be less than 70 mm. The maximum internal diameter may be in the range 11 to 40 mm. The footprint of the bottle (when stood on its base) may have an area in the range 1000 to 10000 $mm^3$. The ratio defined as the maximum internal diameter of the neck divided by the area of the footprint of the bottle may be in the range 0.001 to 0.04.

Advantageously, it is found that said cyclic olefin copolymer (COC) and said polymethylpentene (PMP) do not significantly deactivate oxidizable organic materials for scavenging oxygen in the container body and which may be as described in GB2207439A or U.S. Pat. No. 6,083,585. Thus, the invention extends to a container body as described which incorporates an oxidizable organic material for scavenging oxygen in use. The oxidizable organic material may be mixed with the polymer and said cyclic olefin copolymer (COC) or polymethylpentene (PMP).

The oxidizable organic material may be as described in GB2207439A or U.S. Pat. No. 6,083,585. It may comprise AMOSORB™ from Colormatrix, Monoxbar™ from Constar, Polyshield™ from Invista or ValOR from Valspar.

The oxidizable organic material may include an oxygen-scavenging polymer for example a polyolefin polymer or oligomer. Said container body may include a polyester which includes polyester segments and polyolefin oligomer segments, for example as described in U.S. Pat. No. 6,083,585. Said container body may include a catalyst for catalysing the oxidation of the oxidizable organic material.

The invention extends, in a second aspect, to a container body which comprises a base, a side wall extending from the base and a neck portion arranged to engage a closure for the container body, wherein:

(i) said container body includes a cyclic olefin copolymer (COC) and polyester; or (ii) said container body includes a polymethylpentene (PMP) and polyester;

wherein, optionally in both cases (i) and (ii), the side wall of the container body has an L* of at least 90 and the neck portion has an L* of at least 84. The container body of the second aspect may have any feature of the container body of the first aspect.

According to a third aspect of the invention there is provided a preform for making a container body, for example according to the first aspect or second aspect, the preform comprising:

(i) a polyester;

(ii) a cyclic olefin copolymer (COC) or a polymethylpentene (PMP).

The L* of the preform may be at least 83, preferably at least 84, more preferably at least 85. The L* of the preform may be less than 90 or 88. The L* of the preform may be in the range 83-89 or 83-87.

Said preform preferably includes polyester (eg PET) which is substantially, preferably entirely, unstretched.

A neck portion of said preform preferably includes grooves, for example, screw-threads for releasably engaging a closure.

A ratio (A) defined as the weight of polyester divided by the weight of COC or PMP in the preform may be in the range 8 to 32, preferably in the range 15 to 30, more preferably in the range 15 to 25.

Said preform may include 1 to 10 wt % of COC or PMP, preferably 3 to 8 wt % of COC or PMP, more preferably 3 to 6 wt % of COC or PMP. Said preform may include 85 to 97 wt % of polyester. Said preform may include 88 to 96 wt % of polyester, 3 to 8 wt % of COC or PMP and 1 to 7 wt % of other ingredients. In one preferred embodiment, said preform includes 88.0 to 94.0 wt % of polyester, 3.0 to 6.0 wt % of COC and 1.0 to 7.0 wt % of other ingredients. In another preferred embodiment, said preform includes 88.0 to 94.0 wt % of polyester, 3.0 to 6.0 wt % of PMP and 1.0 to 7.0 wt % of other ingredients.

A single layer of said preform may include 1 to 10 wt % of COC or PMP, preferably 3 to 8 wt % of COC or PMP, more preferably 3 to 6 wt % of COC or PMP. Said single layer of said preform may include 85 to 97 wt % of polyester. Said single layer may include 88 to 96 wt % of polyester, 3 to 8 wt % of COC or PMP and 1 to 7 wt % of other ingredients. In one preferred embodiment, said single layer includes 88.0 to 94.0 wt % of polyester, 3.0 to 6.0 wt % of COC and 1.0 to 7.0 wt % of other ingredients. In another preferred embodiment, said single layer includes 88.0 to 94.0 wt % of polyester, 3.0 to 6.0 wt % of PMP and 1.0 to 7.0 wt % of other ingredients.

Said COC may be as described in the first aspect.

Said PMP may be as described in the first aspect.

Said polyester may be as described in the first aspect.

In said preform, said polyester and said COC or PMP are preferably not wholly miscible. Hence, a mixture comprising said polyester and COC or PMP may include observable regions of COC or PMP dispersed in the polyester. Such regions may be observed by SEM. The observable regions of COC may be particulate for example generally spherical.

The sum of the wt % of thermoplastic polymers (eg polyester(s)), COC(s) and PMP(s) in said preform may be at least 88 wt %, preferably at least 92 wt %, more preferably at least 94 wt %. The sum may be less than 99 wt % or less than 97 wt %.

As described, said preform comprises polyester. Said preform preferably comprises a polyester as the major thermoplastic polymer in the preform. Polyester (especially PET) preferably makes up at least 75 wt %, preferably at least 85 wt %, of the total wt % of thermoplastic polymers in the preform.

Said preform and/or a sidewall thereof preferably includes only one layer of material which suitably defines the preform. Thus, said preform and/or a sidewall thereof preferably do not include any laminated region or multi-layered region.

Said preform may include a first light shielding pigment. Such a pigment may be as described in the first aspect.

Said first light shielding pigment is preferably zinc sulfide (ZnS). Said first light shielding pigment preferably includes at least 95 wt %, especially at least 99 wt % zinc sulfide (ZnS).

Said preform may include a second light shielding pigment. Such a pigment may be as described in the first aspect.

Said second light shielding pigment is preferably particulate metal, for example a metal flake, for example particulate aluminium or aluminium flake. Said second light shielding pigment preferably includes at least 95 wt %, especially at least 99 wt % aluminium.

The sum of the wt % of light shielding pigments (eg said first, said second and/or any other light shielding pigments) in said preform may be less than 8 wt %, preferably less than 6 wt %, especially less than 5 wt %. The sum may be at least 1 wt % or at least 3 wt %. The sum may be in the range 2.0 to 5.0 wt %.

Said preform may include less than 2 wt %, preferably less than 1.5 wt %, more preferably no greater than 1.0 wt % of titanium dioxide. Said preform may include 0 to 2 wt %, preferably 0 to 1.5 wt %, of titanium dioxide. In one embodiment, said preform may include 0 wt % of titanium dioxide.

In one embodiment, said preform includes 88-93 wt % polyester (eg PET), 1-6 wt % zinc sulfide, 3-7 wt % of COC or PMP, 0.01 to 0.2 wt % of particulate aluminium (eg flake).

In a preferred embodiment, said preform includes 88-93 wt % polyester (eg PET), 2-5 wt % zinc sulphide, 4-7 wt % of COC, 0.01 to 0.10 wt % of particulate aluminium (eg flake). In another preferred embodiment, said preform includes 88-93 wt % polyester (eg PET), 2-5 wt % zinc sulphide, 4-7 wt % of PMP, 0.01 to 0.10 wt % of particulate aluminium (eg flake).

Said preform for example a sidewall thereof, may have a thickness of at least 1 mm, at least 2 mm or at least 3 mm. The thickness may be less than 5 mm.

The neck of said preform may have a maximum internal diameter of at least 10 mm or at least 15 mm. The maximum internal diameter may be less than 70 mm. The maximum internal diameter may be in the range 11 to 40 mm.

According to a fourth aspect of the invention, there is provided a formulation for use in a method of making a preform according to the third aspect, the formulation comprising a cyclic olefin copolymer (COC) or polymethylpentene (PMP) which is suitably as described in the first aspect.

Said formulation may include a first light shielding pigment as described in the first aspect. Said first light shielding pigment is preferably zinc sulphide. Said formulation may include at least 10 wt %, preferably at least 15 wt %, more preferably at least 20 wt %, especially at least 25 wt % of said first light shielding pigment. Said formulation may include less than 50 wt %, preferably less than 45 wt %, more preferably less than 42 wt %, of said first light shielding pigment.

Said formulation may include a second light shielding pigment as described in the first aspect. Said second light shielding pigment is preferably particulate metal, for example a metal flake, for example particulate aluminium or aluminium flake. Said second light shielding pigment preferably includes at least 95 wt %, especially at least 99 wt % aluminium. Said formulation may include at least 0.05 wt %, preferably at least 0.1 wt %, more preferably at least 0.15 wt % of said second light shielding pigment. Said formulation may include less than 1 wt %, preferably less than 0.50 wt %, more preferably less than 0.45 wt %, of said second light shielding pigment.

Said formulation preferably includes less than 20 wt %, preferably less than 15 wt %, more preferably less than 12 wt % titanium dioxide.

Said formulation preferably includes less than 5 wt %, preferably 0 wt % of polyester, for example PET.

Said formulation may include 40-70 wt % COC or PMP, 20-50 wt % of said first light shielding pigment, 0.05-1 wt % of said second light shielding pigment, and 0-15 wt % of titanium dioxide.

Said formulation may include 45-65 wt % COC or PMP, 25-45 wt % of said first light shielding pigment, 0.10-0.50 wt % of said second light shielding pigment, and 0-11 wt % of titanium dioxide.

Said formulation may include 55-64 wt % COC or PMP, 25-45 wt % of said first light shielding pigment, 0.10-0.50 wt % of said second light shielding pigment, and 0-11 wt % of titanium dioxide.

Said formulation may include 55-64 wt % COC or PMP, 30-45 wt % of said first light shielding pigment, 0.10-0.50 wt % of said second light shielding pigment, and less than 1 wt % (preferably 0 wt %) of titanium dioxide.

Said formulation is preferably in the form of pellets.

According to a fifth aspect of the invention, there is provided a method of making a container body of the first aspect, the method comprising:

(i) selecting a preform according to the third aspect;

(ii) stretch blow moulding the preform to produce the container body of the first and/or second aspect.

Preferably, during said stretch blowing moulding the preform is not heated to a temperature which is greater than the Tg of the COC or PMP whichever is used. Said preform is preferably stretch blow moulded at a temperature which is less than the Tg of the COC or PMP whichever is used. Preferably, during said stretch blowing moulding the preform is not heated to a temperature which is greater than 130° C., or greater than 125° C. Said preform is preferably stretch blow moulded at a temperature which is less than 130° C., preferably less than 125° C.

The method may comprise selecting a formulation according to the fourth aspect and contacting said formulation with polyester as described according to the first aspect. The method may comprise contacting 5 to 15 wt % of said formulation with 85 to 95 wt % of polyester. The method may comprise contacting 7 to 12 wt % of said formulation with 88 to 93 wt % of polyester.

According to a sixth aspect of the invention, there is provided a method of making a formulation according to the fifth aspect, the method comprising contacting said COC or PMP whichever is used with said first light shielding pigment and/or other ingredients in the formulation. The method may comprise mixing said COC or PMP with said first light shielding pigment and/or other ingredients. The method may comprise extruding said COC or PMP with said first light shielding pigment and/or other ingredients in the formulation. An extrudate may be formed into pellets which may comprise masterbatch pellets.

Any feature of any aspect of any invention or embodiment described herein may be combined with any feature of any aspect of any other invention or embodiment described herein mutatis mutandis.

Specific embodiments of the invention will now be described, by way of example, with reference to the accompanying drawings, in which.

Figure 1:
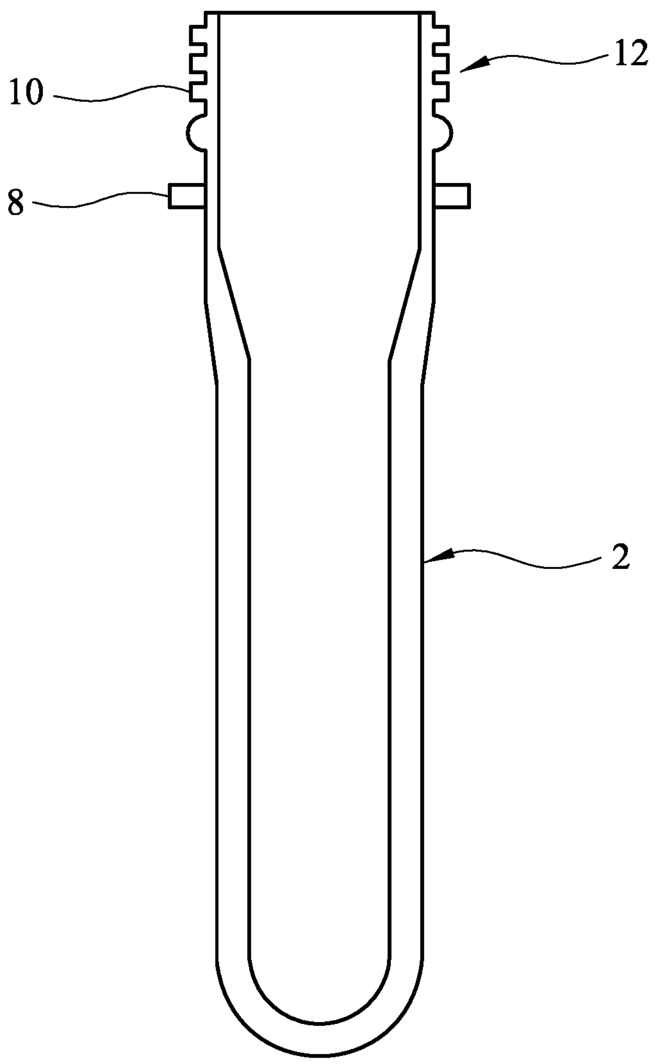
FIG. 1 is a cross-section through a preform.

The following materials are referred to hereinafter:

PET-X—refers to a proprietary bottle grade PET (Lighter C93 from Equipolymers, with an Intrinsic Viscosity (IV) of 0.80+/−0.02).

Comparative Test Material A (CTM-A)—a polyolefin having a Tg of less than 90° C.

Topas 6013 M-07—Cyclic olefin copolymer (COC) obtained from Topas Advanced Polymers. It has the following properties, assessed using the standards referred to:

| Property | Value | Unit | Test Standard |
|---|---|---|---|
| Melt volume rate (MVR) (260° C., 2.16 kg) | 13 | $cm^3$/10 min | ISO 1133 |
| Tensile modulus (1 mm/min) | 2900 | Mpa | ISO 527-3 |
| Glass transition temperature (10° C./min) | 142 | ° C. | ISO 11357-1, -2, -3 |
| DTUL @ 0.45 MPa | 130 | ° C. | ISO 75-1, -2 |

Aluminium paste—refers to STAPA WM Chromal Aluminium flake comprising 80 wt %+/−2 wt % aluminium pigment and 20 wt %+/−2 wt % medical white oil and other additives. 98 wt % of the particles can pass though a 45 micron sieve. The D10 is approximately 4 microns; the D50 approximately 13 microns; and the D90 approximately 28 microns.

PMP (TPX)—refers to polymethylpentene polymer (PMP) sold as TPX RT18 by Mitsui.

Figure 2:
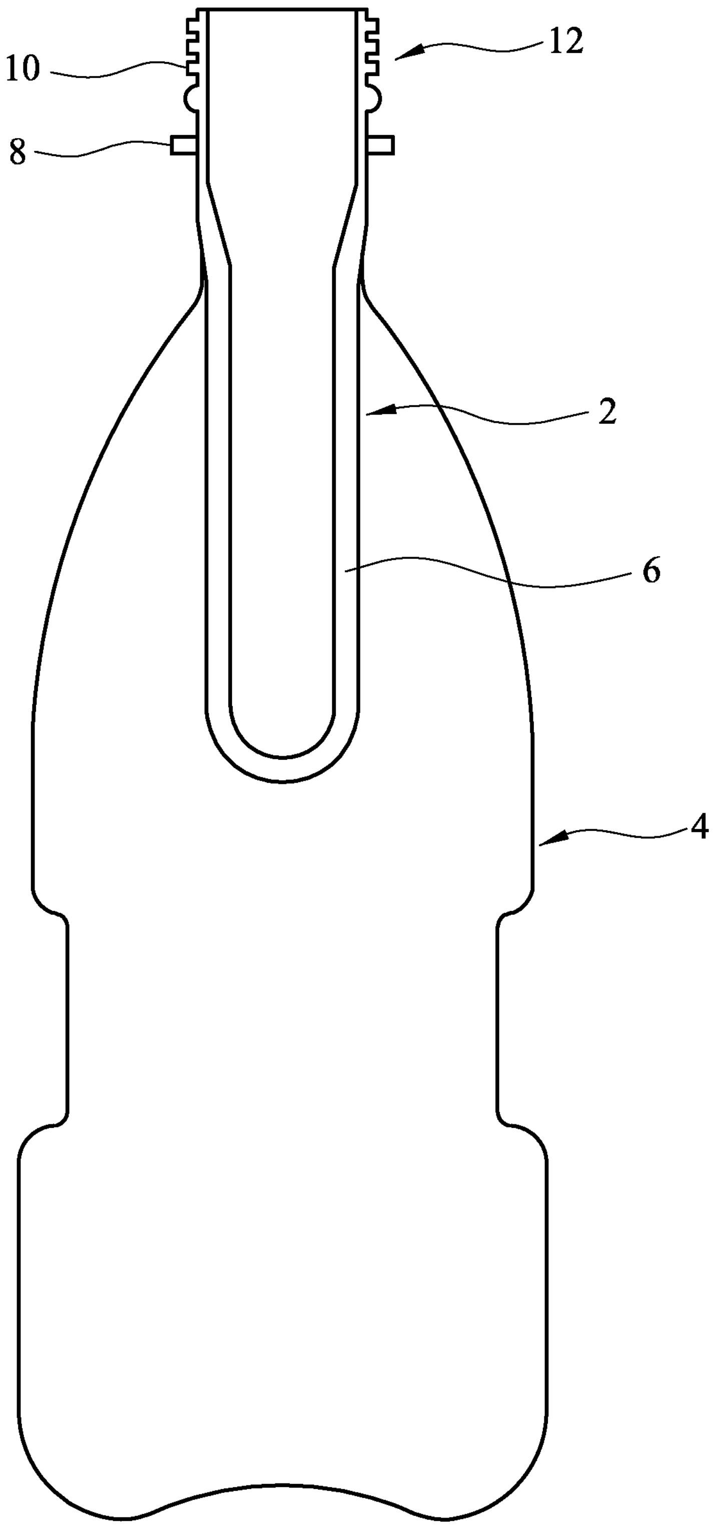
FIG. 2 shows the preform of FIG. 1 superimposed on a bottle blown from the preform to illustrate that a neck of the preform is unchanged on blowing to produce a bottle.

Referring to FIG. 1, a preform 2 for a blow-molded PET bottle 4 (FIG. 2) includes a body 6 which is arranged to expand when the preform 2 is heated in a bottle mold. Above the body 6 is a ring 8 which is generally held by a machine (not shown) during liquid filling of the blow-molded bottle. Above the ring 8 is a cap region 10 with grooves arranged to cooperate with a bottle cap for releasably closing the bottle. Neck region 12 is a portion of the preform 2 which includes cap region 10 and does not expand during blow molding of the preform to produce the bottle. Thus, as illustrated by comparing FIGS. 1 and 2, the neck region 12 is substantially the same size and shape in both the preform and blow-molded bottle. FIG. 2 includes annotated typical preform/bottle dimensions in mm.

The following tests are referred to herein:

Test 1—L*a*b*Colour Space Assessment of Preforms

Preform colour is measured using a Minolta CM2600d spectrophotometer in reflectance mode using D65 illuminant. A preform is positioned on a metal frame (with the main elongate axis of the preform extending substantially horizontally. This allows the spectrophotometer to be positioned in contact with the preform wall at the point of the spectrophotometer aperture. L*, a* and b* values are recorded.

Test 2—L*a*b*Colour Space Assessment of Blow-Molded Bottle

A small (60 mm×60 mm) square section is cut from a bottle wall. This section is placed on the holder of a Minolta CM3600A spectrophotometer, with the outer surface of the bottle section towards the instrument aperture. The Large Area View (LAV) aperture is used, and the colour of the sample is measured in reflectance mode using D65 illuminant. L*, a* and b* values are recorded.

Test 3—Measurement of Light Transmission of Blow-Molded Bottle

Light transmission of each bottle is assessed on a cut section from the bottle wall, using a Shimadzu UV Visible Spectrophotometer with an integrating sphere, across the wavelength range 300-700 nm.

Example 1—General Procedure for Producing Preforms

Preforms are manufactured in a Husky GL160 injection moulder machine, with a two cavity mould installed. PET is weighed and premixed manually with the COC or PMP (TPX) and any other additives at the required percentages and the mixture manually added into a hopper installed above the feed throat of the machine. A standard PET injection moulding process is employed to produce preforms.

Example 2—General Procedure for Producing Bottles From Preforms

Preforms are stretch blow moulded using a Sidel SB01 blow moulding machine into 1 litre cylindrical bottles.

Examples 3 and 4—Scanning Electron Microscopy (SEM) of Preforms and Bottles

Using the general procedures referred to in Example 1, preforms were made having the formulations described in the table below.

| Example No. | PET-X (wt %) | Identity of added polymer | Amount of added polymer (wt %) |
|---|---|---|---|
| 3 | 99 | CTM-A | 1 |
| 4 | 99 | Topas 6013-M-07 | 1 |

To analyse preform material, samples were produced by cutting a section of a preform. Each sample was cryo-fractured with liquid nitrogen to reveal the sample's cross-section. The samples were attached to a sample holder using a carbon based tape and a colloidal dispersion of graphite to increase the conductivity. Finally, the sample was metallized with Pd and Au for 45 seconds. SEM was then undertaken.

To analyse bottles samples for SEM, samples were produced by cutting a section while frozen with liquid nitrogen to reveal the sample's cross-section. The samples were attached to a sample holder using a carbon based tape and a colloidal dispersion of graphite to increase the conductivity. Finally, the sample was metallized with Pd and Au for 45 seconds.

Respective sections were analysed using SEM at 10.0 k SE (M).

The SEM analysis of preforms showed that, for both Examples 3 and 4, generally spherical particles of the added polymer in a discreet phase, separate from a PET-X phase, were observable.

The SEM analysis of blown bottles showed that, for the Example 3 bottle, a homogenous structure was observable and discreet phases seen in the precursor preforms were no longer observed. In contrast, for the Example 4 bottle, generally spherical particles of the added polymer in a discreet phase, separate from the PET-X phase, were still observed.

Example 5—Light Transmission (LT %) of Bottles of Examples 3 and 4

Figure 3:
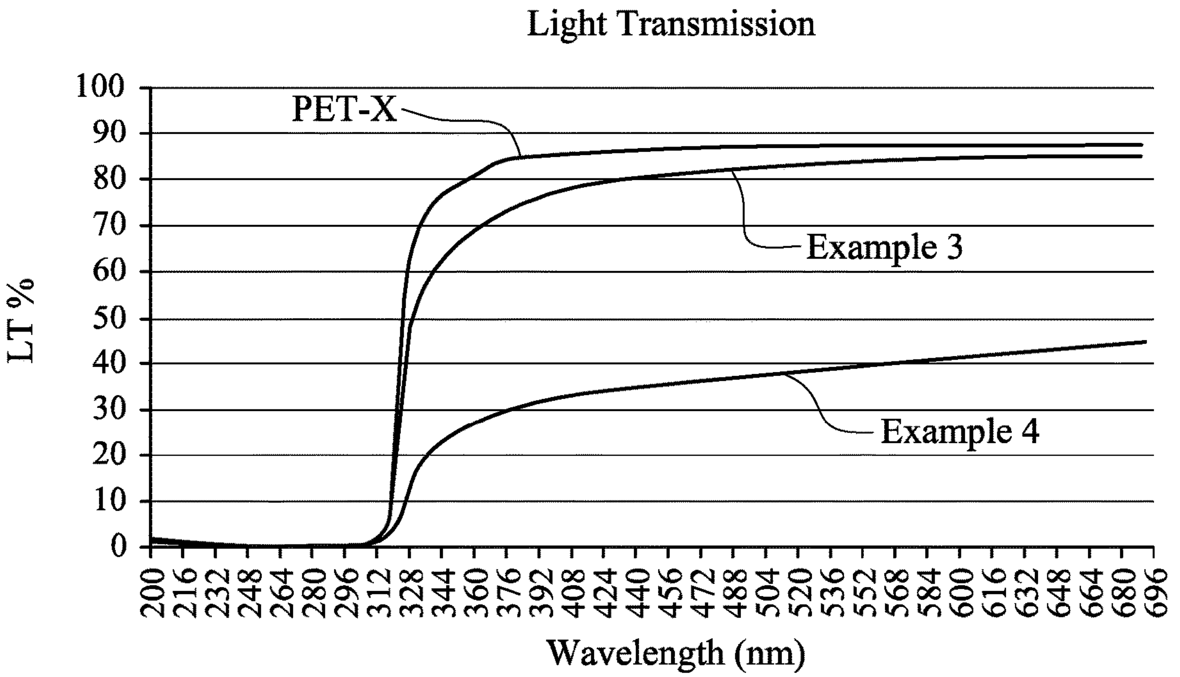
FIGS. 3 and 4 are graphs of light transmission v. wavelength for bottles produced.

The light transmission (LT %) of bottles of Examples 3 and 4 were assessed as described in Test 3 and results are provided in FIG. 3 from which it will be seen that the Example 3 material has almost the same light transmission as PET-X alone which suggests that, if a homogenous structure is produced on blowing, negligible opacity is produced; whereas when the COC polymer is present as a discreet phase, separate from a PET-X phase, significantly increased opacity is achieved. Thus, the bottle blown from the preform described in Example 4 was significantly more opaque than that of the bottle blown from the preform of Example 3. In fact, the bottle blown from the preform of Example 3 was less opaque than the preform from which it was blown.

Example 6—Establishing Target Colour Values for Preforms

To produce bottles with commercially relevant opacity and/or whiteness, additional additives are included in the formulation of example 4. Applicant was able to achieve high opacity and whiteness (ie high L*) by addition of, for example, titanium dioxide and aluminium flake such as described in co-pending application GB 1915770.0. However, it was also observed that, in some cases, the neck portion of a blown bottle was significantly (and aesthetically unacceptably) darker than the body of the bottle. It was concluded by Applicant that opacity in the stretched bottle wall results from stretching the preform during blow molding and, since the neck portion is not stretched during the blow molding process, its opacity remains the same as in the preform from which it is blown. As a result, with a view to producing commercially acceptable bottles, Applicant developed target colour values for a preform wall (and by extension the neck of a bottle blown from the preform, since the neck in the bottle is unstretched as described, and its colour values are substantially identical to the colour values in the preform). The target colour values are detailed below.

| | L* | a* | b* |
|---|---|---|---|
| Target colour values for preform | 86.32 | −1.23 | −1.31 |

Examples 7 and 8—Preparation of Preforms With Target Colour Values

Following the general procedure described in Example 1, preforms were made having the formulations described in the table below.

| Example No | PET-X (wt %) | COC (Topas 6013-M-07)(wt %) | Titanium dioxide (wt %) | Zinc sulphide (wt %) | Aluminium paste (wt %) |
|---|---|---|---|---|---|
| 7 | 90.97 | 5 | 1 | 3 | 0.03 |
| 8 | 90.97 | 5 | 0 | 4 | 0.03 |

Example 9—Assessing Colour Values of Preforms

Following the procedure referred to in Test 1, the colour values of the preforms of Examples 7 and 8 were assessed for comparison with the target colour values of Example 6. Results are detailed in the table below.

| Example No | L* | a* | b* |
|---|---|---|---|
| 7 | 86.97 | −1.23 | −1.38 |
| 8 | 85.83 | −1.07 | −1.14 |

Example 10—Production and Assessment of Bottles

Following the procedure referred to in Example 2, the preforms of Examples 7 and 8 were blown into bottles and assessed. Results were as follows:

| Example No | L*(D65) | a*(D65) | b*(D65) |
|---|---|---|---|
| 7 | 93.27 | −0.32 | −0.17 |
| 8 | 93.42 | −0.28 | −0.14 |

Figure 4:
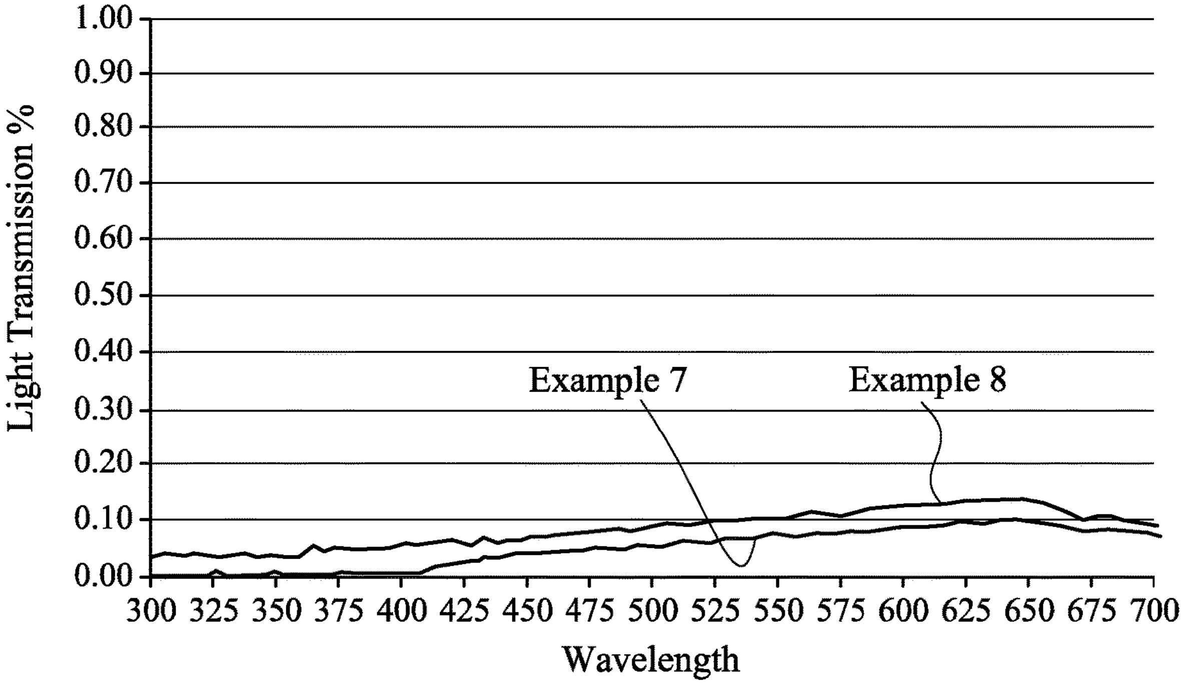

LT % Transmission data for the bottles is provided in FIG. 4 from which it will be noted that the light transmission in both cases is very low.

The results show that the bottles produced have excellent opacity and whiteness. In addition, the neck portions of the bottles (having the colour values referred to in Example 9) were found to be sufficiently similar in colour to be body of the bottle to be aesthetically acceptable—ie to the naked eye, any differences in colour as between the neck and body of the bottle were not significant enough to lessen the perceived aesthetic acceptability of the bottle.

Examples 11 and 12—Scanning Electron Microscopy (SEM) of Preforms and Bottles

Using the general procedures referred to for Examples 3 and 4, preforms were made having the formulations described in the table below.

| Example No. | PET-X (wt %) | Identity of added polymer | Amount of added polymer (wt %) |
|---|---|---|---|
| 11 | 99 | CTM-A | 1 |
| 12 | 99 | PMP (TPX) | 1 |

Preform material was analysed as described for Examples 3 and 4 and SEM analysis of preforms showed that, for both Examples 11 and 12, generally spherical particles of the added polymer in a discreet phase, separate from a PET-X phase, were observable.

The SEM analysis of blown bottles showed that, for the Example 11 bottle, a homogenous structure was observable and discreet phases seen in the precursor preforms were no longer observed. In contrast, for the Example 12 bottle, generally spherical particles of the added polymer in a discreet phase, separate from the PET-X phase, were still observed.

Example 13—Light Transmission (LT %) of Bottles of Examples 11 and 12

The light transmission (LT %) of bottles of Examples 11 and 12 were assessed as described in Test 3 and it was found that the Example 11 material has almost the same light transmission as PET-X alone which suggests that, if a homogenous structure is produced on blowing, negligible opacity is produced; whereas when the PMP polymer is present as a discreet phase, separate from a PET-X phase, significantly increased opacity is achieved. Thus, the bottle blown from the preform described in Example 12 was significantly more opaque than that of the bottle blown from the preform of Example 11. In fact, the bottle blown from the preform of Example 11 was less opaque than the preform from which it was blown.

Examples 14 and 15—Preparation of Preforms With Target Colour Values

Following the general procedure described in Example 1, preforms were made having the formulations described in the table below.

| Example No | PET-X (wt %) | PMP (TPX)(wt %) | Titanium dioxide (wt %) | Zinc sulphide (wt %) | Aluminium paste (wt %) |
|---|---|---|---|---|---|
| 14 | 90.97 | 5 | 1 | 3 | 0.03 |
| 15 | 90.97 | 5 | 0 | 4 | 0.03 |

Example 16—Assessing Colour Values of Preforms

Following the procedure referred to in Test 1, the colour values of the preforms of Examples 14 and 15 were assessed for comparison with the target colour values of Example 6. It was found that the differences in colour values were relatively small and were acceptable.

Example 17—Production and Assessment of Bottles

Following the procedure referred to in Example 2, the preforms of Examples 14 and 15 were blown into bottles and assessed. Results show that the light transmission in both cases is very low. Additionally, the results show that the bottles produced have excellent opacity and whiteness. In addition, the neck portions of the bottles were found to be sufficiently similar in colour to the body of the bottle to be aesthetically acceptable—ie to the naked eye, any differences in colour as between the neck and body of the bottle were not significant enough to lessen the perceived aesthetic acceptability of the bottle.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A container body which comprises a base, a side wall extending from the base and a neck portion arranged to engage a closure for the container body, wherein:

said container body includes a polymethylpentene (PMP) and polyester;

wherein the side wall of the container body has an L* of at least 90, the neck portion has an L* of at least 84 and the L* of the neck portion is less than 90; said container body comprises a substantially homogenous mixture of said polyester and said PMP; and a first ratio defined as the L* of the side wall of the container body divided by the L* of the neck portion is at least 1.03 and is less than 1.15.

2. A container body according to claim 1, wherein: the difference between the L* of the side wall and the neck portion is less than 12.

3. A container body according to claim 1, wherein the difference between the b* of the side wall of the container body and the neck portion of the container body is greater than 1.0 and less than 3.0.

4. A container body according to claim 1, wherein said container body has a light transmission (LT %) at 550 nm as described in Test 3 of less than 1.0%.

5. A container body according to claim 1, wherein: a ratio (A) defined as the weight of polyester divided by the weight of PMP in the container body is in the range 8 to 32; and said container body includes 88.0 to 94.0 wt % of polyester, 3.0 to 6.0 wt % of PMP and 1.0 to 7.0 wt % of other ingredients.

6. A container body according to claim 1, wherein: said PMP has a Vicat softening temperature, measured by ASTM-D 1525 (injection moulded specimen (2 mm thick×2 pcs), heat speed: 50° C./hour with an applied load of 10N), of 165 to 170° C.; said polyester comprises a polyethylene terephthalate; and the difference between the Tg of the polyester and that of said PMP is at least 30° C.

7. A container body according to claim 1, wherein the sum of the wt % of thermoplastic polymers in said container body is at least 94 wt %; and/or the sum is less than 97 wt %.

8. A container body according to claim 1, wherein said container body includes a first light shielding pigment which is zinc sulphide.

9. A container body according to claim 8, wherein said container body includes less than 8 wt % of said first light shielding pigment; and includes at least 1 wt % of said first light shielding pigment.

10. A container body according to claim 9, wherein said container body includes less than 2 wt % of titanium dioxide; and the sum of the wt % of light shielding pigments in said container body is less than 8 wt %.

11. A container body according to claim 9, wherein said container body includes a second light shielding pigment which is a particulate metal.

12. A container body according to claim 11, wherein said container body includes less than 0.050 wt % of said second light shielding pigment.

13. A container body according to claim 1, wherein said container body includes 88-93 wt % polyester, 1-6 wt % zinc sulfide, 3-7 wt % of PMP, 0.01 to 0.2 wt % of particulate aluminum.

14. A container body according to claim 1, wherein:
the L* of the side wall of the container body is less than 98; the L* of the neck portion is at least 83 and less than 88;
the side wall of the container body has a b* and the neck portion of the container body has a b* and a difference between the b* of the side wall of the container body and the neck portion of the container body is greater than 1.0 and is less than 3.0; and
said container body has a light transmission (LT %) at 550 nm as described in Test 3 of less than 1.0%.

15. A container body according to claim 1, wherein:
a ratio (A) defined as the weight of polyester divided by the weight of PMP in the container body is in the range 15 to 25;
said container body includes 88.0 to 94.0 wt % of polyester, 3.0 to 6.0 wt % of PMP and 1.0 to 7.0 wt % of other ingredients; and
said polyester comprises a polyethylene terephthalate.

16. A container body according to claim 15, wherein said container body includes 88-93 wt % polyester, 1-6 wt % zinc sulfide, 3-7 wt % of PMP and 0.01 to 0.2 wt % of particulate aluminum.

17. A container body which comprises a base, a side wall extending from the base and a neck portion arranged to engage a closure for the container body, wherein:
said container body includes a polymethylpentene (PMP) and polyester;
wherein the side wall of the container body has an L* of at least 90 and the neck portion has an L* of at least 84;
the difference between the L* of the side wall and the neck portion is less than 12;
the L* of the side wall of the container body is less than 98;
the L* of the neck portion is less than 88;
a first ratio defined as the L* of the side wall of the container body divided by the L* of the neck portion is at least 1.03 and is less than 1.15; and
the side wall of the container body has a b* and the neck portion of the container body has a b* and a difference between the b* of the side wall of the container body and the neck portion of the container body is greater than 1.0; and
said container body comprises a substantially homogenous mixture of said polyester and said PMP.

18. A container body which comprises a base, a side wall extending from the base and a neck portion arranged to engage a closure for the container body, wherein:
said container body includes a polymethylpentene (PMP) and polyester;
the side wall of the container body has an L* of at least 90 and the neck portion has an L* of at least 84;
the difference between the L* of the side wall and the neck portion is less than 9;
said container body includes 88.0 to 94.0 wt % of polyester, 3.0 to 6.0 wt % of PMP and 1.0 to 7.0 wt % of other ingredients;
said container body includes 1 to 8 wt % of a first light shielding pigment; and
said container body includes 0.001 to 1.0 wt % of a second light shielding pigment which is a particulate metal; and
said container body is defined by a substantially homogenous mixture of said polyester, said PMP, said first light shielding pigment and said second light shielding pigment.

19. The container body of claim 18, wherein said container body includes 88-93 wt % PET, 1-6 wt % zinc sulfide and 0.01 to 0.2 wt % of particulate aluminium.

* * * * *